(12) United States Patent
Korsberg et al.

(10) Patent No.: US 7,930,041 B2
(45) Date of Patent: Apr. 19, 2011

(54) INDUSTRIAL CONTROLLER WITH COORDINATION OF NETWORK TRANSMISSIONS USING GLOBAL CLOCK

(75) Inventors: Edward C. Korsberg, Solon, OH (US); David A. Vasko, Solon, OH (US); Darren R. Klug, Willoughby, OH (US); Petr Ptacek, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 275 days.

(21) Appl. No.: 12/240,462

(22) Filed: Sep. 29, 2008

(65) Prior Publication Data

US 2010/0082117 A1    Apr. 1, 2010

(51) Int. Cl.
*G05B 11/01* (2006.01)
*G06F 13/00* (2006.01)

(52) U.S. Cl. .............. 700/19; 700/3; 700/14; 710/110

(58) Field of Classification Search .......... 700/3, 14, 700/19; 710/110, 314; 370/438
See application file for complete search history.

(56) References Cited

U.S. PATENT DOCUMENTS

| | | | |
|---|---|---|---|
| 4,759,017 A * | 7/1988 | Allan et al. | 370/438 |
| 6,236,277 B1 | 5/2001 | Esker | |
| 6,535,926 B1 | 3/2003 | Esker | |
| 6,687,257 B1 | 2/2004 | Balasumbranian | |
| 2004/0100982 A1 * | 5/2004 | Balasubramanian | 370/429 |
| 2004/0207342 A1 * | 10/2004 | Novikov | 315/312 |
| 2005/0201408 A1 * | 9/2005 | Otani et al. | 370/438 |

FOREIGN PATENT DOCUMENTS

| | | |
|---|---|---|
| DE | 100 62 353 A1 | 7/2002 |
| DE | 10062353 A1 * | 7/2002 |
| DE | 1253494 A2 * | 10/2002 |
| DE | 103 21 652 A1 | 12/2004 |
| EP | 1 253 494 A2 | 10/2002 |
| EP | 1 538 497 A2 | 6/2005 |
| EP | 1 574 921 A2 | 9/2005 |

OTHER PUBLICATIONS

Patsiopoulos, N., European Search Report, European Patent Office, Nov. 30, 2009, The Hague, The Netherlands.
Holl, R. and Vangompel, D., DeviceNet adaption of IEEE—1588, 2004 Conference on IEEE 1588, Sep. 27-29, 2004, National Institute of Standards and Technology, Gaithersburg, MD, USA.
Moldovansky, Anatoly, Application of IEEE 1588 in Industrial Automation and Motion Control Systems, 2005 Conference on IEEE 1558, Oct. 10, 2005, Winterthur, Switzerland.

* cited by examiner

*Primary Examiner* — Sean P Shechtman
(74) *Attorney, Agent, or Firm* — Boyle Fredrickson LLP; R. Scott Speroff; John M. Miller

(57) ABSTRACT

An industrial control system communicating among various control elements via a serial network synchronizes the scanning loops associated with collecting and forwarding data along the network so as to substantially reduce transmission delay and jitter, using synchronization information passed along the network.

22 Claims, 4 Drawing Sheets

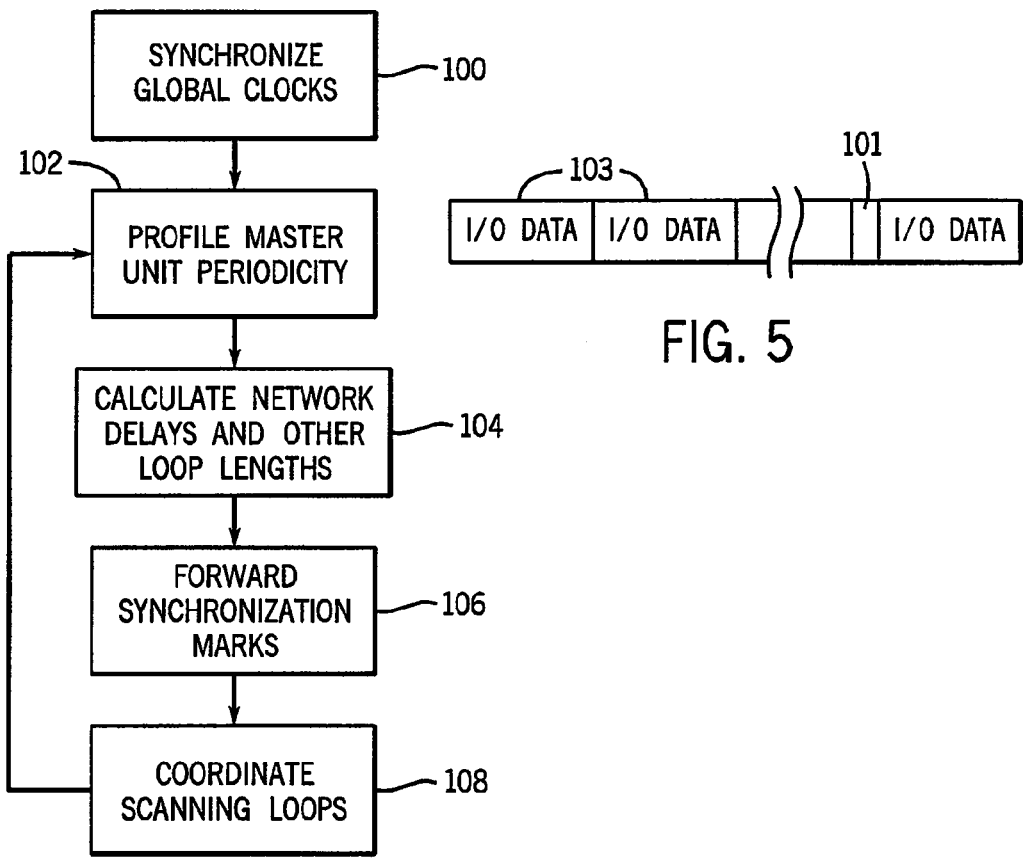
FIG. 4
FIG. 5
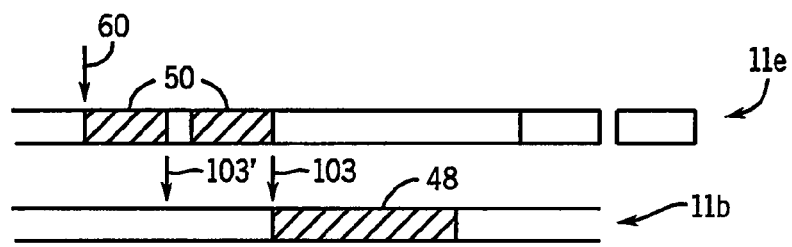
FIG. 7

INDUSTRIAL CONTROLLER WITH COORDINATION OF NETWORK TRANSMISSIONS USING GLOBAL CLOCK

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to industrial controllers for controlling equipment and processes and, in particular, to an industrial control system using a network and providing reduced jitter in control signals transmitted on the network and improved network utilization.

Industrial control systems are special-purpose computers used for controlling industrial processes or manufacturing equipment. Under the direction of a stored program, a programmable controller examines a series of inputs reflecting the status of the controlled process or equipment and changes outputs effecting the control of the process or equipment. The inputs and outputs may be binary (i.e., "on" or "off") or, alternatively, analog, the latter taking on a continuous range of values. The binary inputs and outputs may be represented by single bits of data; the analog inputs and outputs may be represented by multiple-bit data words. The control program may have portions executed cyclically by the programmable controller to correspond with repeated reading and writing of input and output data The input and output data normally is obtained from one or more input or output (I/O) modules which collect data from the controlled process or machine, and provide data from the programmable controller to the controlled process or machine. Because the various control points of a process or machine are often spatially distributed about a factory or manufacturing facility, the I/O modules may be connected to the programmable controller by one or more communication networks which transmit data among different control elements connected to the network as discrete data packets.

Network connections between elements of the industrial control system provide great flexibility in interconnecting these control elements. A single conductor may be routed among various elements and new elements added by simply adding an additional network tap. Network hubs, switches, and routers allow arbitrarily complex networks to be readily created permitting great flexibility in constructing and adapting the network topology.

In this respect, each of the control elements of the industrial control system may incorporate or be associated with a network adapter. For example, the I/O modules may be collected in a rack associated with a network adapter, the latter which cyclically collects data from the I/O modules and periodically transmits this collected data on the network to the programmable controller and periodically receives corresponding data from the programmable controller for outputting to the controlled process or equipment. Likewise, a network adapter may be associated with the programmable controller.

The communication networks used in industrial control systems are characterized by being highly reliable and by delivering data with a minimal and well-defined delay, as is required for real-time control. A number of different communication networks are commonly used in the industrial controller art including but not limited to: ControlNet™, DeviceNet™, and EtherNetIP™ whose specifications are published and whose protocols are used broadly by a number of manufacturers and suppliers. These communication networks, and particular implementations of these communication networks, differ from one another in physical aspects, for example, the type of media (e.g., co-axial cable, twisted pair, light fiber, etc.), the protocols of its operation, (e.g., baud rate, number of channels, word transmission size, use of connected messaging, etc.) and how the data is formatted and how it is collected into standard messages.

A well-known protocol for communication networks used for industrial control is the "connected messaging" protocol listed above. As is understood in the art, connected messaging establishes a logical connection between two control elements on a network (e.g. the network adapter of the programmable controller and the I/O adapter) which pre-allocates network bandwidth and buffer space at the control elements to ensure predictable and timely transmission of the data on the network without collisions and other unpredictable network delays. This may be contrasted to unconnected messaging systems where changes in network traffic can unpredictably affect the communication of messages.

The complexity of networks used for industrial control has increased, not only with respect to the number of network nodes (e.g. control points) but also with respect to the need for complex network topologies, including network hubs, bridges, routers and the like, needed to connect the control points to the network. This complexity can present problems of having adequate network bandwidth (a measure of the information capacity of the network in a given unit of time) while providing low transmission delay and jitter, the latter a measurement of the variability in the arrival time of data. Low delay and jitter are important to precise control where coordination and execution order of timed elements can be critical.

SUMMARY OF THE INVENTION

The present inventors have recognized that a significant source of jitter and network inefficiency comes not from problems with the underlying speed of the network itself, but in the existence of asynchronous "scanning loops" associated with connections to the network and interconnections between network sections. These scanning loops define times of transmissions of given data on the network that may be unrelated to the time when that data is needed by the receiving device for retransmission or processing by the control program. A network message that arrives early in a scanning loop, for example, for a bridge, must queue for longer than a network message that arrives late in a scanning loop. When there are multiple scanning loops associated with a network transmission, these variations in delay become the dominant contribution to jitter and average delay. An analogy may be made with respect to travel on a bus requiring multiple transfers between buses. Even if the average bus speeds are constant, the time required to complete a trip may vary substantially from variation in alignment between arrival and departure schedules at each transfer point. Traditionally designers have tried to get around this limitation by oversampling and thus reducing the sample to sample latency. This reduces the latency, but at a high cost. If data is sent at twice the speed, the communication interface must be able to handle twice the traffic or the number of communication connections must be reduced by a factor of 2. If this doubling were to occur at each hop in a multi-hop network, the message arrive rate could easily be unmanageable.

The present invention provide coordination signals so that the scanning loops at the various stages of network transmission may be made synchronous and, in fact, so that data that is transmitted can be ensured to arrive just before the beginning of the next scanning loop at the receiving device to reduce absolute delay as well as jitter. This process also frees up network bandwidth that is necessitated with today's oversampling scheme by eliminating the multiple redundant transmissions that would arrive within the period of a single scanning loop Specifically then, the present invention provides an industrial control system comprising a set of spatially separated control elements including, for example, a programmable controller, a network adapter, an I/O adapter and an I/O module. Each of these control elements may be associated with an operation cycle. The industrial control system includes a global clock system providing a synchronized timebase at the control elements. A profiler defines master cycle initiation times based on the cycle of a given control element with reference to the synchronized timebase and defines corresponding cycle initiation times. A synchronization system receives the cycle initiation times and synchronizes execution of cycles of the control elements so that data transmitted between a first and second control element arrives at the second control element substantially at a start of the cycle of the second control element.

It is thus a feature of at least one embodiment of the invention to synchronize scanning loops of intercommunicating control elements to reduce jitter and delay in the transmission of data and to provide more efficient use of network bandwidth. It is another feature of at least one embodiment of the invention to permit a synchronization process which may operate dynamically or predictively (as driven by the profiler) to minimize mismatch between scanning loops.

The master cycle initiation times may be the start of execution of the control program.

It is thus a feature of at least one embodiment of the invention to deliver data to the programmable controller on a just-in-time basis.

Alternatively, the master cycle initiation times may indicate a start of a periodic cycle of the controlled process.

It is thus a feature of at least one embodiment of the invention to permit the entire industrial control unit to be synchronized to its controlled process to allow just-in-time delivery of data to the controlled process.

Alternatively or in addition the master cycle initiation time may be at the start of a cycle of a control element having the longest cycle.

It is thus a feature of at least one embodiment of the invention to provide for more efficient bandwidth utilization by not delivering data more frequently than it can be used by the next network element.

The profiler may be in a control element or in a separate terminal.

It is thus a feature of at least one embodiment of the invention to provide a flexible trade-off between the simplicity of off-line profiling during configuration of the control system and dynamic profiling incorporated into the control system.

The network may further include a switch element (for example, a bridge, router or hub) joining two networks.

It is thus a feature of at least one embodiment of the invention to provide a synchronization system that may operate through off-the-shelf network elements or control elements such as I/O modules that do not participate in the synchronization process.

The synchronization system may be part of a connected messaging system that pre-allocates scheduled communication slots for communication on a network and the scheduled communication slots may be rescheduled according to the cycle initiation time.

It is thus a feature of at least one embodiment of the invention to permit sophisticated rescheduling of data transmissions to promote coordination of different scanning loops using conventional connected messaging capabilities.

The synchronization system may generate the corresponding cycle initiation times for other control elements by subtracting a processing delay, a media delay, and a cycle time of an other control element from the master cycle initiation times of the given control element.

It is thus a feature of at least one embodiment of the invention to reduce network delay and maximize available bandwidth by taking into account network latency.

The network delay may be obtained from the global clock system.

It is thus a feature of at least one embodiment of the invention to make use of the same calculations needed to coordinate a universal clock to accurately determine network delay between control elements.

The synchronization system may change a period of the cycle of at least one of the other control elements in response to the cycle initiation times thereby increasing system bandwidth.

It is thus a feature of at least one embodiment of the invention to reduce data transmission that cannot be utilized because of a slow scanning loop.

The profiler operates repeatedly at a predetermined time interval and the synchronization system may transmit the cycle initiation times on the network at the time interval.

It is thus an feature of at least one embodiment of the invention to allow dynamic and automatic loop coordination even as the control program or number of control elements is changed.

These particular objects and advantages may apply to only some embodiments falling within the claims and thus do not define the scope of the invention.

BRIEF DESCRIPTION OF THE FIGURES

FIG. 4 is a flow-chart of the synchronization process implemented by the present invention;

FIG. 5 is a timing diagram of data transmitted on the network showing interleaving of I/O data and synchronization data;

FIG. 7 is a figure similar to that of FIG. 6 showing an implementation of the invention providing for a "pre-try" to provide a flexible trade-off between freeing bandwidth and managing noise immunity

DETAILED DESCRIPTION OF THE PREFERRED EMBODIMENT

Figure 1:
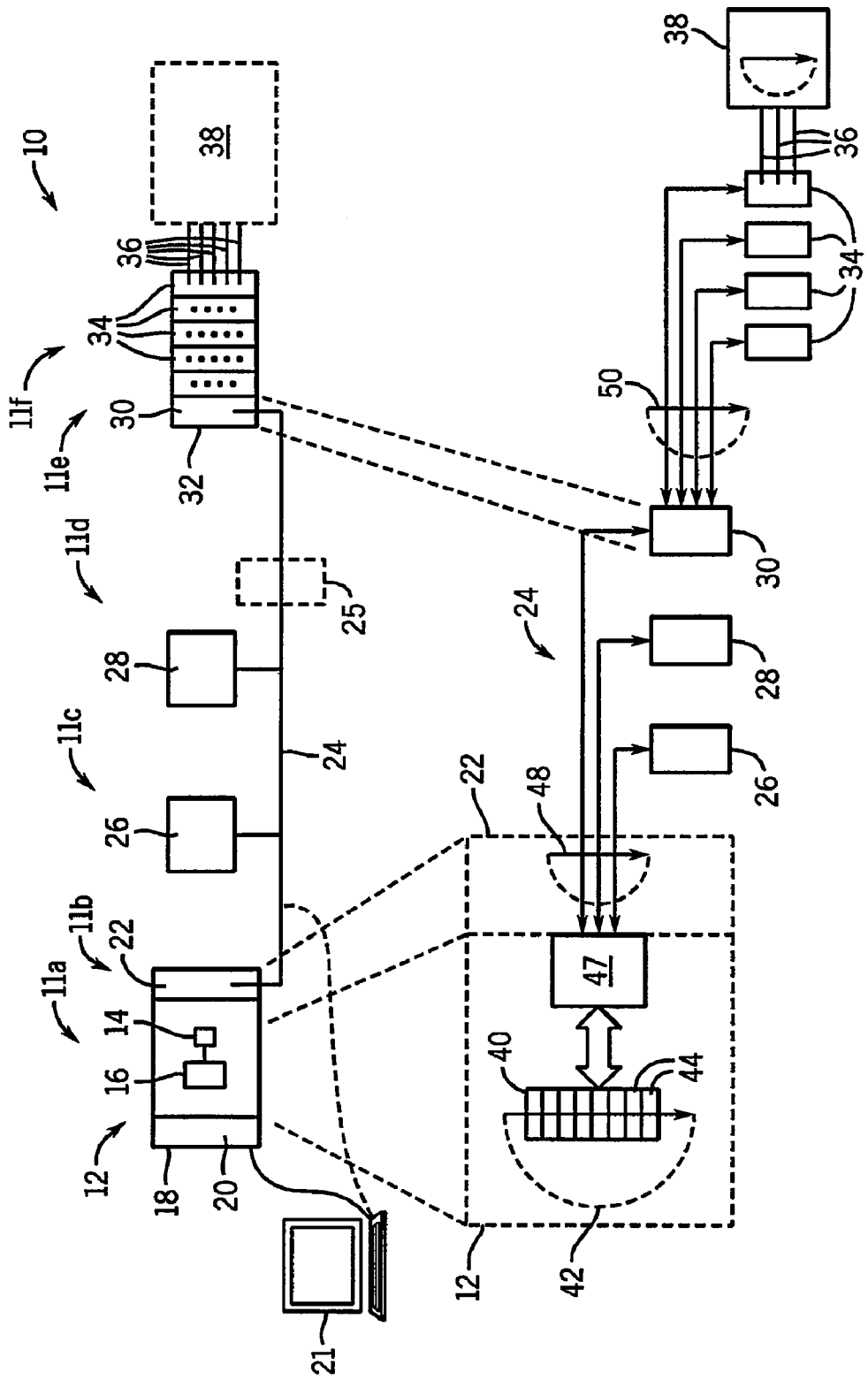
FIG. 1 is a simplified view of an industrial control system comprised of multiple control elements intercommunicating on a network and showing the scanning loops at different stages of that communication.

Referring now to FIG. 1, an industrial control system 10 may provide multiple intercommunicating control elements 11a-f including, principally, a programmable controller 12. The programmable controller 12 includes one or more microprocessor(s) 14 executing a stored program held in memory 16, the stored program prepared to provide a desired control process.

The programmable controller 12 may be held in a rack 18 together with a power supply 20 and a network adapter 22. The network adapter 22 communicates with a network 24, for example, being any of a number of well-known control networks such as ControlNet™, DeviceNet™, and EtherNetIp™. The network 24 may include one or more network switches 25 according to methods well known in the art. In addition, the network 24 may be implemented in part or in whole on a backplane.

The network 24 interconnects the programmable controller 12 (via network adapter 22) with other control elements 11 which may be, for example, motor drives 26, I/O modules 28, and the like, and may also be connected to an I/O adapter 30 held in a rack 32, the I/O adapter communicating in turn with multiple I/O modules 34. The I/O modules 34 provide input and output signals 36 to a controlled process 38 under the control of the programmable controller 12, the latter communicating with the I/O modules 34 through the network 24. Generally, the system may include as few as two control elements 11 which could be the same control element (for example, to programmable controllers or to I/O modules).

A workstation or terminal 21 may also be connected directly to the programmable controller 12 or to the programmable controller 12 through the network 24 and may be used to develop the control program and, as will be described below, to determine synchronization times for the various control elements 11.

Referring still to FIG. 1, the programmable controller 12 may execute a control program 40 in a scanning loop 42 so that the instructions 44 of the control program 40 are executed in sequence from a first instruction to a last instruction and then this sequence is repeated. This scanning loop will typically have a cycle period determined by the number and complexity of the instructions 44 and thus the cycle period may change when the control program 40 is changed. Individual instructions will generally have different execution times within the cycle period and during some execution cycles, instruction blocks may be skipped or added. During the execution of these instructions 44, data may be exchanged between the programmable controller 12 and I/O data table in a scanner 47 holding values to be output to the controlled process 38 by the I/O modules 34 and data input from the controlled process 38 by the I/O modules 34. While a single scanning loop 42 is shown, it will be understood that this is the simplest case and that multiple scanning loops 42 may be envisioned for different data elements to be exchanged with the different control elements 11.

The I/O data table in the scanner 47 is updated by a second scanning loop 48 implemented by the network adapter 22 communicating via a backplane or other electrical interconnection with the programmable controller 12. This scanning loop 48 sequentially exchanges data between the I/O data table of the scanner 47 and each of the control elements 11 (e.g., 26, 28, and 30) in a regular sequence and then repeats this process on a regular basis. Generally this scanning loop 48 is determined by the connected messaging system and type and number of control elements and thus is not necessarily unilaterally imposed by the network adapter 22. This scanning loop may have a slowly changing cycle period determined by a internal schedule of the network adapter 22 and the limited by the processing speed of the network adapter 22, communication delays and the like. Again, for simplicity, a single scanning loop 48 is shown however there could be multiple scanning loops 48 associated with multiple exchanged data values. Each of these scanning loops 48 may have the same or different periods.

The I/O adapter 30 also provides a third scanning loop 50 in which data is exchanged sequentially between the I/O adapter and each of the I/O modules 34. This scanning loop 50 also has a characteristic period and cycle times for the data.

Figure 2:
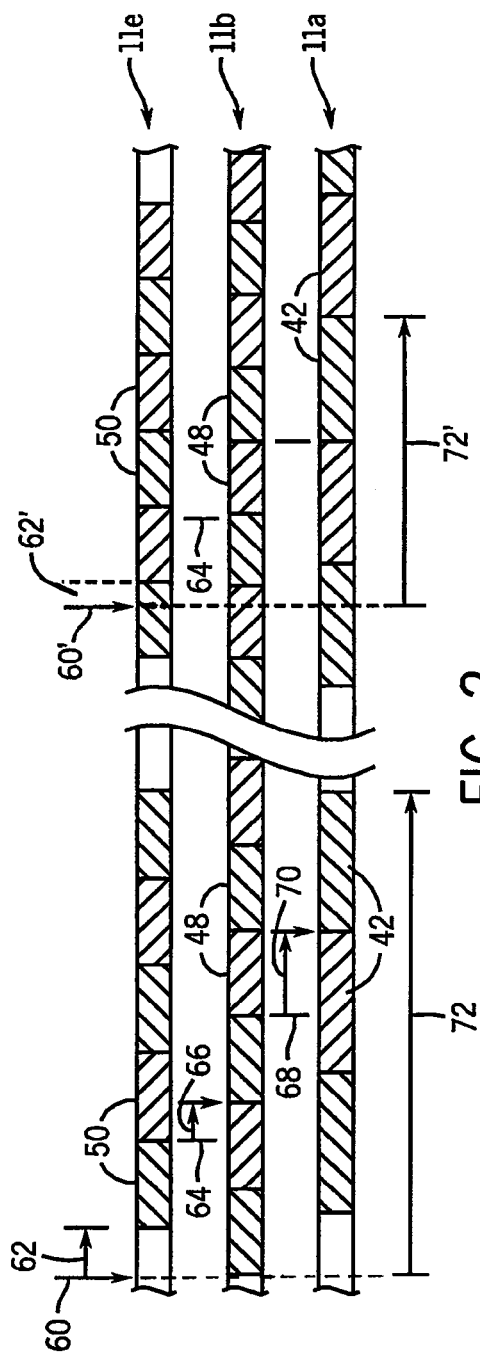
FIG. 2 is a timing diagram showing the asychronicity of three periodic scanning loops such as introduces variable delay in the transmission of a message through the network.

Referring now to FIG. 2, the scanning loops 50 may be repeated asynchronously with respect to the scanning loop 48 and the scanning loop 42. Generally each of these scanning loops 50, 48, and 42 will be of different lengths and separations.

Consider at this time, the communication of an input signal received at one of the I/O modules 34 at time 60. Assuming that time 60 is slightly before a scanning loop 50 of the adapter 30 there will be a first wait time 62 before the data from the I/O module is collected by the adapter 30. This waiting time 62 is determined primarily by the cycle time of the scanning loop 50. Upon completion of the on-going scanning loop 50, the adapter 30 may transmit the data of the input signal on the network at time 64 which may be, for example, a wait time 66 before the next initiation of a scanning loop 48 of the network adapter 22. For the purpose of this illustration, the cycle time of the scanning loop 50 depicted also includes the I/O processing time and the time for transmission on the backplane.

The network adapter 22 may place the received data in the I/O data table of the scanner 47 at time 68 at the end of the scanning loop 48 following time 64. Again, time 68 may be a wait time 70 before the next scanning loop 42 of the scanning loop 42 of the programmable controller 12. The programmable controller 12 will use the data at given times after the beginning of the scanning loop 42, these time delay(s) will be ignored in this example.

As a result of the need for the input signal to traverse these asynchronous scanning loops 50, 48, and 42, the total transmission times 72 of the message include delays 62, 66 and 70 plus the length of the scanning loops 50, 48, and 42. It will be understood that even if scanning loops 50, 48, and 42 are relatively short, or if the associated device may respond to data before completion of the cycles, the delays 62, 66 and 70 may be substantial.

Referring still to FIG. 2, consider, now, a second example in the same system with an input signal arriving at time 60' at an I/O module 34 immediately before the start of scanning loop 50. In this case, the signal is acquired by the adapter 30 without substantial delay and retransmitted to the network adapter 22 at the time 64. If this time 64 is immediately before a scanning loop 48, again, the signal is acquired by the adapter 22 with minimal or no delay. At the conclusion of scanning loop 48 the signal may be available to the I/O data table of the scanner 47 immediately before a scanning loop 42, allowing the total transmission time 72' to be substantially shorter than total transmission time 72 having eliminated wait times 62, 64, and 70.

Because the arrival time 60 or 60' is generally asynchronous to the scanning loops 50, 48, and 42, and each of these cycles asynchronous to each other, the length of the wait times 62, 64, and 70 are generally not known. Further, because the alignment of the scanning loops 50 and 48 and 42 is constantly shifting, the average delay caused by wait times 62, 64, and 70 will tend to be at least half the maximum delay caused by wait times 62, 64, and 70. In addition to this delay, a variability in delay is created that will result in substantial jitter, constraining the system's ability to provide precise timings.

Figure 3:
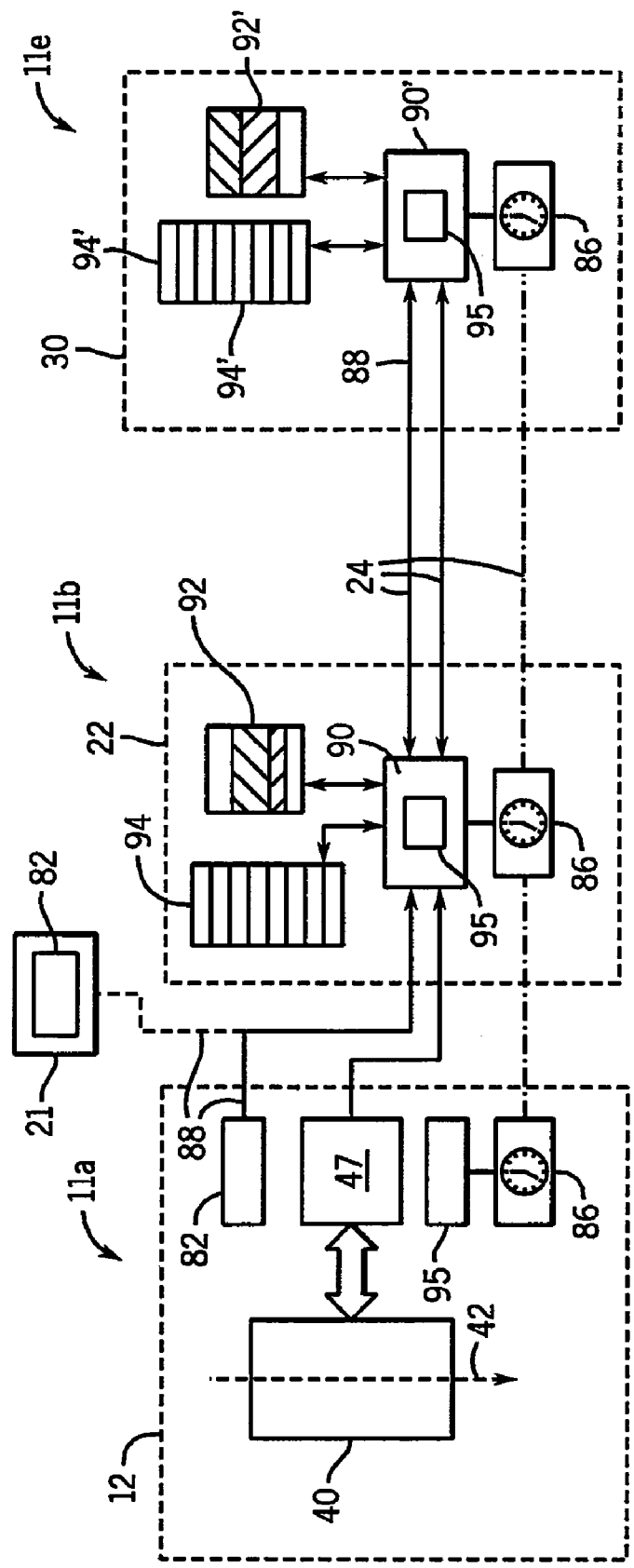
FIG. 3 is a block diagram of a programmable controller, network interface, and I/O adapter showing different control elements that may implement a synchronization of the scanning loops per the present invention.

Referring now to FIG. 3, the present invention may provide for a profiling operation implemented by a profiler 82 that may be located in one or more of the control elements, for example, in the programmable controller 12 or externally for example in the terminal 21. In the former example, the profiler 82 may be implemented through a set of instructions 80 in the control program 40 or elsewhere in the programmable controller 12, while in the latter example, the profiler 82 may be implemented by the development environment producing the control program and configuration data for the various control elements 11.

Generally the profiler 82 serves to determine cycle initiation times needed to synchronize the scanning loops 50, 48 and 42 and works with synchronization systems 95 implemented by dedicated or existing hardware in each of the control elements 11 and with a global clock 86 providing for a synchronized timebase among control elements 12, 26, 28 and 30. In this regard, the profiler 82 identifies a control element 11 requiring information, and designates a series of master cycle initiation times repeating on a regular basis indicating when the data is required. The master cycle initiation times generally have a constant period comparable to a scanning loop of the identified control element. For this reason, the master cycle initiation times may be expressed as a first master cycle initiation time and a period and the subsequent times determined algorithmically. Correspondingly, all cycle initiation times may be transmitted either as a single absolute time value and a period, or as multiple absolute times. When it is stated that multiple cycle initiation times are transmitted, either of these techniques may be used.

Methods for establishing a high precision global clock 86 among control elements communicating on a network is known in the art and described, for example, in U.S. Pat. No. 6,535,926, Time synchronization system for industrial control network using global reference pulses" and U.S. Pat. No. 6,236,277, "Low deviation synchronization clock" assigned to the assignee of the present invention and hereby incorporated by reference and is incorporated into various standards such as IEEE 1588-2002 Precision Clock Synchronization Protocol for Networked Measurement and Control Systems. Communications between the control elements 11 necessary to establish a coordinated universal time of global clock 86 may also be transmitted on the network 24 as will be described.

In a first example, the profiler 82 will be used to synchronize the control system 10 with the scanning loop 42 of the programmable controller 12. For this purpose, the profiler 82 collects information about the scanning loops 42, 48 and 50 of the control elements 11 as well as media delay between the control elements and processing delay in the transmission of data and determines for the programmable controller 12 a master cycle initiation times 88 with respect to the global clock 86 and provides corresponding cycle initiation times 88 to the synchronization systems 95 in the other control elements 11*b* and 11*c* based on the master cycle initiation times. It will be understood in this context that the corresponding cycle initiation times 88 are a schedule of absolute times, typically on a periodic basis equal to the period of the master cycle initiation times and preceding the master cycle initiation times by an amount suitable to ensure data arrives just before the master cycle initiation times.

This coordination process is implemented by synchronization systems 95 in each of the control elements 11. Generally, these synchronization systems 95 have the task of ensuring that the scanning loops 42, 48, 50, respectively, remain aligned with the corresponding master cycle initiation times 88 or corresponding cycle initiation times 88, In the programmable controller 12, for example, the synchronization system 95 may be implemented by instructions executed by the processor 14, while, for example, in the network adapter 22 these synchronization system 95 may be implemented by a connection manager 90 responsible for establishing connected messaging on the network 24.

The connection manager 90 is associated with a buffer 92 and a transmission schedule 94 as will be described. The connection manager 90 may open a connection with other control elements 11, for example, with a corresponding connection manager 90' of I/O adapter 30 having buffer 92' and schedule 94'. As is generally understood in the art, the connection manager 90 opens a connection with the I/O adapter by establishing a connection ID used to identify data packets sent between the two, and by reserving space in a buffer 92 so that the ability to receive those data packets can be guaranteed, and by scheduling the data packets with respect to a portion of the network bandwidth as represented by a schedule 94. By scheduling messages and reserving buffer space it can be ensured that messages may be reliably transmitted without collision or other assuming all control elements participate in the scheduling system.

The connection managers 90, 90' may include synchronization systems 95 that may work in conjunction with the connection manager to change the schedule 94 of data transmissions as will now be described.

Referring to FIGS. 3 and 4, as indicated by process block 100, in a first step of this process, global clocks 86 in each of the elements 11 may be synchronized using a well-known clock synchronization system. Such systems normally deduce network delay and transmit coordinating time signals that have been compensated by this delay so as to provide closely corresponding times at each element 11. In this process, network delay is well characterized.

At process block 102, a profiler 82 determines a cycle initiation times for each of the control elements 11. To do so, as indicated by process block 104, the profiler 82 collects network (and processing) delay information for each of the control elements 11 (in turn derived from the synchronization of the global clock 86) with respect to each of the control elements 11 as well as any scanning loop cycle lengths for those devices as determined by their synchronization systems 95 and a review of their schedules 94. Alternatively, this information can be determined from a stored table of empirically derived data. The corresponding cycle initiation times for a given control element are then the master cycle initiation time minus the cycle times, processing delay, and media delay associated with the given control element and the network and other control elements between the given control element and the control element of the master cycle initiation time.

As indicated by process block 106, the profiler 82 then forwards master cycle initiation times 88 and corresponding cycle initiation times 88 (in absolute times of the global clocks 86 or a single absolute time and a period) to each of the control elements 11 and the control elements coordinate scanning loops 42, 48, and 50 as indicated by process block 108 through their synchronization systems 95. This process of synchronizing may simply start each scanning loop 50, 48, and 42 at the end of the previous time plus an amount for processing time and network delay. Alternatively, this process may be performed in a distributed fashion and the profiler 82 may simply indicate the absolute time that it would like to receive the data for other profilers 82 in the control elements 11 to determine their own cycle initiation times 88.

As indicated by process block 108, the various control elements 11 then synchronize their scanning loops to conform with the cycle initiation times 88.

Referring to FIG. 5, generally the cycle timing information for the scanning loops 50, 48, and 42 will change relatively slowly if at all, so the profiling process of FIG. 4 and the transmission of necessary data 101, including the master cycle initialization times, corresponding cycle initiation times, and network and processing delay information, may be sent relatively infrequently as interleaved with a large number of data packets 103 carrying I/O data. In one embodiment this data 101 may be sent only when there is a system change, for example, upon a change in the programming or in the hardware comprising the industrial control system 10.

Figure 6:
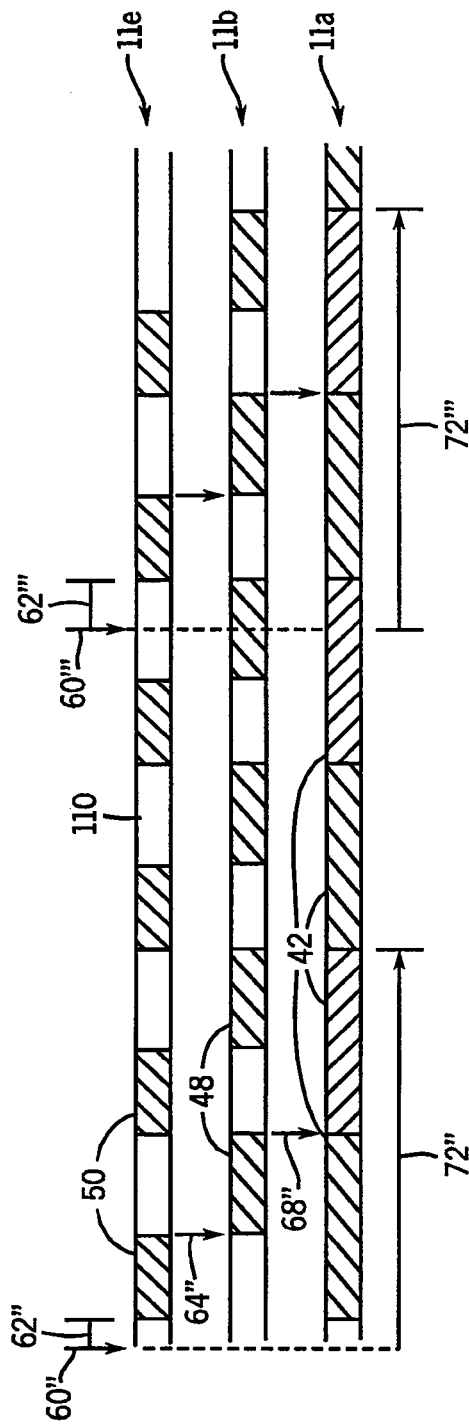
FIG. 6 is a figure similar to that of FIG. 2 showing a reduction in delay and jitter produced by the present invention and an increase in network capacity.

Referring now to FIG. 6, this process essentially aligns scanning loops 50, 48, and 42 so that the end of one closely coincides with the beginning of the next. In this case, a message arriving at time 60" may experience a wait time 62" before the start of a scanning loop 50 but then the end of scanning loop 50 aligns closely with the beginning of scanning loop 48 at time 64" and the end of scanning loop 48 at time 68" aligns closely with the beginning of a scanning loop 42. A similar alignment occurs for a latter message arrival time 62'". The result is that different transmission times 72" (associated with message arrival time 60"), 72'" (associated with message arrival time 60'") are both shorter and more consistent in length.

Note that while FIG. 6 depicts a single message transmission for each scanning loop (50, 48, or 42) in cases where noise may corrupt the transmission, the benefits obtained by the present invention may be lost from the need to send "re-try" packets based on the receiving control element 11 detecting a corrupted received packet. Accordingly, referring to FIG. 7, the present invention contemplates flexibly adding one or more "pre-try" packets 103' be for the just in time packet 103 delivered just start of the subsequent scanning loop (in this case scanning loop 48). The packets 103' and 103 are still synchronized with respect to the cycle initiation times 88 but are redundant so that if packet 103 is corrupted packet 103' may be used with a negligible additional processing delay to still achieve the time savings of the present invention. By adding additional pre-try packets 103' an arbitrary degree of noise immunity may be obtained albeit with an incremental loss of the bandwidth potentially obtainable by the present invention In an alternative embodiment, the profiling at process block 104 determines the control element 11 having the longest cycle (e.g., scanning loop 50) and will prevent transmissions of the same data during cycles 110 within the length of that longest cycle from a previous scanning loop 50 allowing better utilization of network bandwidth and thereby allowing for additional control points.

In an alternative embodiment, the profiler 82 may synchronize the process not with the programmable controller 12 but with a signal received by an I/O module 34 so that the execution of the control program is synchronized to the controlled process 38. This may be useful for high-speed control of periodic controlled processes 38.

Different cycle initiation times may be used for data passing in different directions, for example, to always synchronize with the data recipient. And a given control element 11 may use multiple cycle initiation times for different data packets communicated between the control elements 11

The present invention has been described in terms of the preferred embodiment, and it is recognized that equivalents, alternatives, and modifications, aside from those expressly stated, are possible and within the scope of the appending claims.

We claim:

1. An industrial control system comprising a set of spatially separated control elements interconnected on at least one network, the control elements including at least two of:
   (i) a programmable controller having a cycle defining repeated use of data within a control program;
   (ii) a network adapter having a cycle defining repeated communication with control elements on the network;
   (iii) an I/O adapter connected to the network having a cycle defining repeated communication with I/O modules having electrical connections to sensors and actuators effecting control of a controlled process; and
   (iv) an I/O module communicating with a controlled process having a cycle defining repeated exchange of data with the controlled process; and
   the industrial control system comprising:
   (i) a global clock system providing a synchronized timebase at the control elements;
   (ii) a profiler defining a master cycle initiation time based on a cycle of a given control element from the set of spatially separated control elements with reference to the synchronized timebase and providing corresponding cycle initiation times to other control elements from the set of spatially separated control elements;
   (iii) a synchronization system receiving the cycle initiation times and synchronizing execution of cycles of the control elements based on the cycle initiation times and the synchronized timebase so that data is transmitted from the other control elements to the given control element to arrive at the given control element substantially at a start of the cycle of the given control element.

2. The industrial control system of claim 1 wherein the master cycle initiation times are at a start of execution of the control program.

3. The industrial control system of claim 1 wherein the master cycle initiation times are at a start of a periodic cycle of the controlled process.

4. The industrial control system of claim 1 wherein the master cycle initiation times are for a control element having a longest cycle.

5. The industrial control system of claim 1 further including a switch element joining two networks.

6. The industrial control system of claim 1 wherein the profiler is in a control element.

7. The industrial control system of claim 1 wherein the profiler is in a device external to the control elements and the cycle initiation times are loaded into each control element.

8. The industrial control system of claim 1 wherein the synchronization system is part of a connected messaging system that pre-allocates scheduled communication slots for communication on a network and wherein the scheduled communication slots are rescheduled according to the cycle initiation time.

9. The industrial control system of claim 1 wherein the synchronization system generates the corresponding cycle initiation for other control elements' times by subtracting a processing delay, a media delay, and a cycle time of an other control element from the master cycle initiation times of the given control element.

10. The industrial control system of claim 1 wherein the synchronization system changes a time of the cycle of at least one of the other control elements in response to the cycle initiation time.

11. The industrial control system of claim 1 wherein the profiler operates repeatedly and the synchronization system transmits the cycle initiation times on the network periodically at a predetermined time.

12. The industrial control system of claim 1 wherein network delay calculations used by the synchronization system are obtained from the global clock system.

13. A control element forming part of an industrial control system comprising:
a set of spatially separated control elements interconnected on at least one network, the control elements selected from the group consisting of:
(i) a programmable controller having a cycle defining repeated execution of a control program;
(ii) a network adapter having a cycle defining repeated communication with control elements on the network;
(iii) a switch element joining two networks; and
(iv) an I/O adapter connected to the network having a cycle defining repeated communication with I/O modules having electrical connections to sensors and actuators effecting control of a controlled process, the controlled process having a cycle defining repeated operation of the controlled process;
the control element comprising:
(i) a global clock system providing a synchronized timebase coordinated with other control elements;
(ii) a synchronization system receiving a cycle initiation times and synchronizing execution of cycles of the control element based on the cycle initiation times and the synchronized timebase so that data transmitted from the control element and to another control element arrives at the other control element substantially at a start of the cycle of the other control element.

14. The control element of claim 13 wherein the synchronization system is part of a connected messaging system that pre-allocates scheduled communication slots for communication on a network and wherein the scheduled communication slots are rescheduled according to the cycle initiation time.

15. The control element of claim 13 wherein the cycle initiation times are received via a network connection.

16. A method of operating an industrial control system comprising a set of spatially separated control elements interconnected on at least one network, the control elements including at least two of:
(i) a programmable controller having a cycle defining repeated execution of a control program;
(ii) a network adapter having a cycle defining repeated communication with control elements on the network; and
(iii) an I/O adapter connected to the network having a cycle defining repeated communication with I/O modules having electrical connections to sensors and actuators effecting control of a controlled process, the controlled process having a cycle defining repeated operation of the controlled process;
the method comprising the steps of:
(i) establishing synchronized timebase at the control elements;
(ii) determining operation of a first control element to define master cycle initiation times of the cycle of the control element with reference to the synchronized timebase;
(iii) providing corresponding cycle initiation times to other control elements; and
(iv) synchronizing execution of cycles of the control elements based on the corresponding cycle initiation times and the synchronized timebase so that data transmitted between a first and second control element arrives at the second control element substantially at a start of the cycle of the second control element indicated by the master cycle initiation times.

17. The method of claim 16 wherein the master cycle initiation times are at a beginning of execution of the control program.

18. The method of claim 16 wherein the master cycle initiation time are at a beginning of a cycle of the controlled process.

19. The method of claim 16 wherein the corresponding cycle initiation times occur at least two times between master cycle initiation times to provide improved noise immunity.

20. The method of claim 16 wherein the control elements employ connected messaging that pre-allocates scheduled communication slots for communication on a network and wherein the scheduled communication slots are rescheduled according to the cycle initiation times.

21. The method of claim 16 wherein the corresponding cycle initiation times for other control elements are generated by subtracting a processing delay, a media delay, and a cycle time of the first control element from the master cycle initiation times of the second control element in the transmission of data between the first control element and the second control element.

22. The method of claim 16 wherein a period of the cycle of at least one of the other control elements is slowed in response to the cycle initiation times thereby increasing available system bandwidth.

* * * * *